United States Patent [19]
Sobel

[11] 3,800,003
[45] Mar. 26, 1974

[54] BUTENES ISOMERIZATION, SEPARATION AND ALKYLATION

[75] Inventor: Jay E. Sobel, Highland Park, Ill.

[73] Assignee: Universal Oil Products Company, Des Plaines, Ill.

[22] Filed: Mar. 31, 1972

[21] Appl. No.: 240,069

[52] U.S. Cl............................ 260/683.49, 260/683.2
[51] Int. Cl............................ C07c 3/54, C07c 5/30
[58] Field of Search..... 260/683.61, 683.49, 683.53, 260/683.43, 683.2, 683.48, 683.65

[56] References Cited
UNITED STATES PATENTS

| | | | |
|---|---|---|---|
| 2,427,293 | 9/1947 | Matuszak | 260/683.65 |
| 2,594,343 | 4/1952 | Pines | 260/683.2 |
| 3,217,059 | 11/1965 | Hervert et al. | 260/683.2 |
| 3,663,646 | 5/1972 | Chapman | 260/683.49 |
| 2,502,015 | 3/1950 | Matuszak | 260/683.49 |
| 3,467,728 | 9/1969 | Hervert | 260/683.2 |
| 3,078,321 | 2/1963 | Van Pool et al. | 260/683.49 |

*Primary Examiner*—Delbert E. Gantz
*Assistant Examiner*—G. J. Crasanakis
*Attorney, Agent, or Firm*—James R. Hoatson, Jr.; William H. Page, II; Robert W. Erickson

[57] ABSTRACT

A process for producing an alkylation reaction product from an isoparaffinic reactant and an olefinic reactant containing 1-butene, 2-butene and isobutylene which includes passing the olefinic reactant through an isomerization zone, fractionating the isomerization zone effluent to separate 2-butene from 1-butene and isobutylene, passing the 2-butene to an alkylation zone with the isoparaffinic reactant and an alkylation catalyst, recycling a portion of the 1-butene and isobutylene to the isomerization zone, and passing a portion of the 1-butene and isobutylene to the alkylation zone with the 2-butene and isoparaffinic reactant.

4 Claims, 1 Drawing Figure

PATENTED MAR 26 1974　　3,800,003
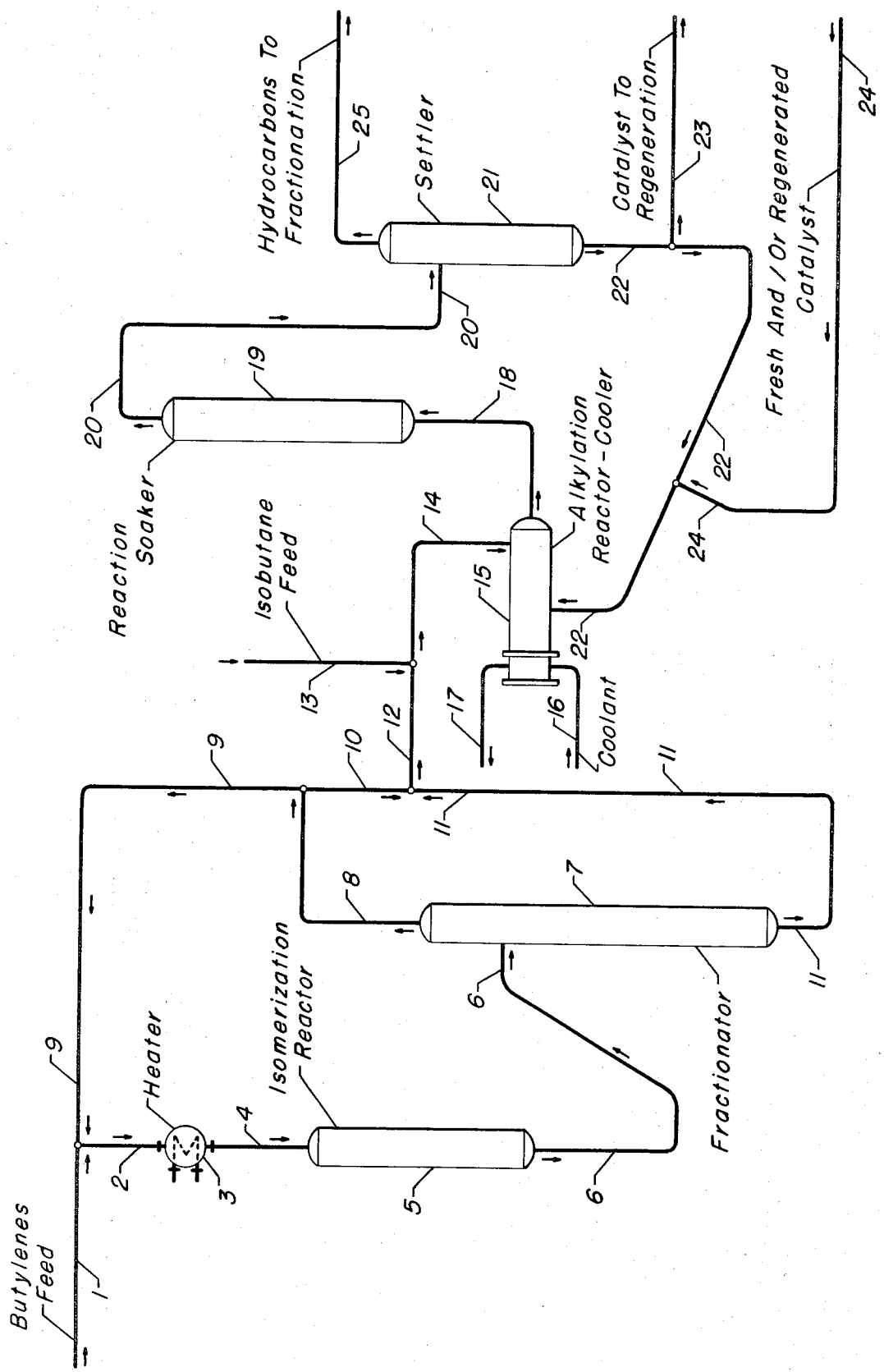

BUTENES ISOMERIZATION, SEPARATION AND ALKYLATION

BACKGROUND OF THE INVENTION

This invention relates, in part, to a process for alkylating an isoparaffinic hydrocarbon with an olefinic hydrocarbon. More specifically, this invention relates, in part, to a process for producing an alkylation reaction product from an isoparaffinic reactant and an olefinic reactant which contains 1-butene, 2-butene and isobutylene. This invention further relates, in part, to a process for isomerizing olefinic hydrocarbons. More specifically, this invention relates, in part, to a process for isomerizing 1-butene to provide 2-butene.

The use of catalytic alkylation processes to produce gasoline boiling range isoparaffins having valuable antiknock properties and suitable as motor fuel blending components is well known in the petroleum refining art. Generally, the alkylation of isoparaffins with olefins is accomplished by contacting the reactants with an acid-acting catalyst such as hydrogen fluoride or sulfuric acid to form a reaction mixture, settling the mixture to separate the catalyst from the hydrocarbons, and further separating the hydrocarbons, for example, by fractionation, to recover the alkylation reaction product. The alkylation reaction product, normally a mixture of $C_5$–$C_{10}$ saturates, is termed "alkylate." "Alkylate" is typically a mixture of isomers of $C_5$–$C_9$ hydrocarbons, the composition depending upon the particular isoparaffinic and olefinic reactants utilized. In commercial alkylation processes, the isoparaffin employed is normally isobutane, while the olefinic reactant is typically a mixture of 1-butene, 2-butene and isobutylene, or a mixture of the butenes with amylenes and/or propylene. The more highly branched hydrocarbons, such as trimethylpentanes, are preferred components in products of alkylation processes as opposed to less branched hydrocarbons such as dimethylhexanes, because the more highly branched hydrocarbons provide a higher octane motor fuel blending stock.

The isomerization of olefins is also known. The double bond present in olefinic hydrocarbons generally shift readily over various catalysts to a more central position in the organic molecule. Composites of a metal from Group VIII of the Periodic Table with a refractory inorganic oxide are well known catalysts in producing olefinic bond migration.

Since the product of commercial isoparaffin-olefin alkylation processes finds use as a motor fuel blending component, a continuing goal of the art is to provide an alkylation process which produces an alkylate product possessing higher research and motor octane ratings than are obtained with existing techniques. This goal has become even more important recently because of an increased emphasis on reducing the amount of lead compounds used in motor fuels to increase the octane rating. The importance of alkylate in upgrading other motor fuel blending stocks to meet high octane requirements has thus correspondingly increased. The process of the present invention provides a novel and economical method for providing a higher octane product from an isoparaffin-olefin alkylation process than is provided by prior art processes.

SUMMARY OF THE INVENTION

It is an object of this invention to provide an improved reaction product in an isoparaffin-olefin alkylation process. It is a further object of this invention to provide an economical method for isomerizing, separating and alkylating butene isomers in an isoparaffin-olefin alkylation process.

In a broad embodiment, the present invention relates to an improved process for producing an alkylation reaction product from an isoparaffinic reactant and an olefinic reactant containing 1-butene, 2-butene and isobutylene which comprises the steps of: contacting said olefinic reactant with an isomerization catalyst in an isomerization zone at olefin isomerization conditions; separating at least a portion of the effluent from said isomerization zone to provide a 2-butene stream and a 1-butene-isobutylene stream; contacting at least a portion of said 2-butene stream with said isoparaffinic reactant and with an alkylation catalyst in an alkylation zone at alkylation conditions; introducing at least a portion of said 1-butene-isobutylene stream into said isomerization zone; and recovering said alkylation reaction product from the effluent from said alkylation zone.

In a more specific, limited embodiment, the process of the present invention includes the foregoing steps and also includes passing a portion of the 1-butene-isobutylene stream into the alkylation zone and commingling the 1-butene-isobutylene stream passed into the alkylation zone with the 2-butene stream, the isoparaffinic reactant and the alkylation catalyst, to provide a superior alkylation reaction product.

It is known that the alkylation reaction product obtained by alkylating an isoparaffin such as isobutane with 2-butene or isobutylene is superior as a motor fuel blending component to the reaction product obtained when the isoparaffin is alkylated with 1-butene. I have found that the alkylation of commingled 2-butene and isobutylene with an isoparaffin provides an alkylation reaction product which is superior to the product obtained when 2-butene and isobutylene are alkylated separately and the resulting alkylation reaction products combined. Moreover, I have found that the synergistic effect of alkylating 2-butene and isobutylene together is further enhanced when the alkylation of the 2-butene-isobutylene mixture is undertaken in the absence of 1-butene. By effectively separating most of the 1-butene from the mixture of butene isomers normally utilized as the olefinic reactant in a commercial isoparaffin olefin alkylation process, and alkylating a 2-butene-isobutylene mixture, an improved alkylation reaction product is recovered.

The normal boiling point of 1-butene is about 20° F. and the normal boiling point of isobutylene is about 19.6° F. These boiling points are quite close together, so that separating 1-butene from isobutylene by fractionation is impractical. The normal boiling points of cis- and trans-2-butene are about 38.7° F. and 33.6° F., respectively, so that isobutylene and 1-butene can be separated from 2-butene by fractionation. Such a separation, however, is not capable of providing the 2-butene-isobutylene mixture, substantially free from 1-butene, which I have found to produce a superior alkylation product when reacted with isobutane. By employing the method herein disclosed, 1-butene can be substantially eliminated from the olefinic charge to an alkylation reactor, while a mixture comprising 2-butene and isobutylene is reacted with an isoparaffin to provide a superior alkylation reaction product. The benefits of alkylating a substantially 1-butene-free mixture of 2-butene and isobutylene may, in this way, be provided in an alkylation process which employs an economical, conventional source of olefinic reactant comprising a mixture of butene isomers.

Further objects, embodiments and illustrations indicative of the broad scope of the present invention will be apparent to those skilled in the art from the description of the drawing and preferred embodiments of the invention hereinafter provided.

DESCRIPTION OF THE DRAWING

The attached drawing illustrates a particular embodiment of the present invention. Referring to the drawing, a conventional butylenes feed, comprising 20 vol. percent 1-butene, 25 vol. percent isobutylene, 30 vol. percent 2-butene and 25 vol. percent isobutane, is charged through conduit 1 and passed into conduit 2 wherein it is commingled with recycled 1-butene and isobutylene from conduit 9. The commingled hydrocarbons stream in conduit 2 is passed into heater 3. The hydrocarbons passed through heater 3 are heated to the temperature desired at olefin isomerization conditions, e.g., about 100° F. to about 300° F. The heated hydrocarbons are withdrawn from heater 3 and passed through conduit 4 into isomerization reactor 5. Isomerization conditions employed in isomerization reactor 5 are preferably maintained to avoid polymerization of isobutylene in the hydrocarbon charged thereto, while converting as large a fraction as possible of the 1-butene in the charge stock into 2-butene. The conditions are, therefore, maintained as mild as possible consistent with an adequate conversion of 1-butene. The hydrocarbons charged are contacted with a fixed bed of an isomerization catalyst comprising hydrogen mordenite combined with substantially anhydrous boron trifluoride. The hydrocarbons are passed continuously through isomerization reactor 5 at a liquid hourly space velocity (volume of charge per volume of catalyst per hour) of about 0.1 to about 20, preferably in downward flow over the catalyst bed, and continuously withdrawn from reactor 5 through conduit 6. The isomerization reactor effluent in conduit 6 is charged to fractionator 7, which is a conventional fractionation vessel. In fractionator 7, a mixture of isobutylene and any 1-butene, remaining after the isomerization step, is separated and withdrawn overhead through conduit 8. The mixture of hydrocarbons in conduit 8, comprising predominantly isobutylene, with some 1-butene, is divided into two portions. A first portion is passed into conduit 9 and recycled via conduit 2 to isomerization reactor 5. A second portion of the hydrocarbon mixture in conduit 8, preferably an amount about equal to the amount of isobutylene charged into conduit 1 in the fresh olefins feed, is passed into conduit 10. Referring again to fractionator 7, 2-butene is separated and withdrawn as a liquid from the bottom of fractionator 7 through conduit 11. The hydrocarbon streams in conduits 10 and 11 are commingled in conduit 12. Conventional isobutane alkylation feed is charged into conduit 13. The hydrocarbon mixture in conduit 12 and the isobutane feed in conduit 13 are combined in conduit 14 and charged to alkylation reactor-cooler 15. In reactor-cooler 15, the hydrocarbons charged through conduit 14 are intimately commingled with hydrogen fluoride alkylation catalyst charged via conduit 22. Heat generated in the alkylation reaction in reactor-cooler 15 is withdrawn by the use on indirect heat exchange means, not shown, which are a part of reactor-cooler 15. Coolant is charged through conduit 16 to reactor-cooler 15, passed in indirect heat exchange with the reaction mixture of hydrocarbons and catalyst, and withdrawn from reactor-cooler 15 through conduit 17. After maintaining the reaction mixture of catalyst and hydrocarbons in reactor-cooler 15, at a temperature of about 50° F. to about 100° F., a pressure sufficient to provide liquid phase operations, and for a time sufficient to provide substantially complete reaction of the olefins charged, the reaction mixture is withdrawn from reactor-cooler 15 through conduit 18 and passed into reaction soaker 19. In reaction soaker 19, which preferably contains baffle sections or perforated trays, not shown, to maintain the reaction mixture in a homogeneous state, reaction mixture is held for a time sufficient to eliminate alkyl fluorides, e.g., about 1 minute to about 20 minutes. The reaction mixture is then withdrawn from soaker 19 through conduit 20 and passed into settler 21. In settler 21, hydrogen fluoride catalyst forms a separate heavier phase and is withdrawn from the bottom of settler 21 through conduit 22. A portion of the catalyst in conduit 22 is diverted through conduit 23 and passed to catalyst regeneration means not shown. Fresh and/or regenerated catalyst is charged through conduit 24 into conduit 22. Catalyst in conduit 22 is charged to reactor-cooler 15 for further use in the alkylation reaction. Referring again to settler 21, a lighter hydrocarbon phase separates and is withdrawn overhead through conduit 25 and passed to further conventional separation operations, such as fractionation, to separate the alkylation reaction product from, for example, isobutane, which can be recycled for further use. The alkylation reaction product is recovered and passed out of the process. Various conventional equipment and operations have not been described in the foregoing, such as pumps, valves, heat exchange means, etc. The use of such conventional equipment and operations will be understood to be essential and the method of their use in the process of the present invention will be obvious to those skilled in the art.

DETAILED DESCRIPTION OF THE INVENTION

The olefinic reactant containing 1-butene, 2-butene and isobutylene employed in the present process may comprise solely butene isomers, or may contain other hydrocarbons. It is contemplated that the olefinic feed employed in a conventional isoparaffin-olefin alkylation process is suitable for use as the olefinic reactant in the present process, in that such a conventional feed normally comprises a mixture of 1-butene, 2-butene and isobutylene. However, other materials may be present in the olefinic reactant, including for example, paraffins, naphthenes or aromatics, as well as minor amounts of contaminants. A conventional olefinic reactant which could be utilized as the olefinic feed to an isoparaffin-olefin alkylation process may contain such other olefins as propylene or amylenes. An olefinic reactant containing some higher and lower molecular weight olefins is suitable for use in the process of the present invention. In addition, a suitable olefinic reactant may contain some propane, normal butane, isobutane, pentanes, dienes, etc., which hydrocarbons are often present in minor amounts in a conventional olefinic reactant feed to an alkylation process. It is preferred that the olefinic reactant employed in the present process contain at least about 30 vol. percent $C_4$ olefins.

Suitable isoparaffinic reactants for use in the alkylation step of the present invention include isobutane, 2-methylbutane, 2-methylpentane, 3-methylpentane, and similar higher molecular weight isoparaffins as well as mixtures thereof. Isobutane is the preferred isoparaffinic reactant. The isobutane feed to a conventional isoparaffin-olefin alkylation process is suitable for use in the present process. Typically, such a conventional isobutane feed stock contains about 90 vol. percent or more isobutane with minor amounts of propane, normal butane, pentane, olefins, etc., and such an isobutane feed stock is suitable for use in the present process.

The olefinic feed in the process of the present invention is first contacted with an isomerization catalyst in an isomerization zone at olefin isomerization conditions. Isomerization catalysts which can be employed in the isomerization operation of the present invention include catalysts which produce a shift of the olefinic bond in 1-butene to a more central position in the hydrocarbon molecule to form 2-butene. Various catalysts have been found suitable in prior art, including, for example, alumina, silica, zirconia, chromium oxide, boron oxide, thoria, magnesia, aluminum sulfate, and combinations of two or more of the foregoing. Also employed have been acidic catalysts such as sulfuric acid, phosphoric acid, aluminum chloride, etc., either in solution or on a solid support. Also suitable for use in the isomerization operation as an isomerization catalyst is a boron halide-modified metal oxide such as boron halide-modified substantially anhydrous or hydrous alumina. Thermal isomerization may be utilized, but suffers from the defect of producing excessive amounts of side products.

A preferred isomerization catalyst for use in the isomerization operation of the present invention comprises a crystalline aluminosilicate combined with a substantially anhydrous boron halide. Preferably, the aluminosilicate, or zeolite, employed in the catalyst has pore openings of about 4 to about 15 Angstroms in cross-sectional diameter. The aluminosilicate employed can be used as conventionally prepared or can be treated to improve its catalytic activity by techniques such as ion-exchange, calcination, etc. Ordinarily, the aluminosilicates employed in the preferred catalyst are synthetically prepared in the sodium form. Each sodium cation is associated with a negatively charged $AlO_4$ tetrahedron in the zeolite structure. The aluminosilicate may be ion-exchanged, preferably with polyvalent cations such as calcium, magnesium, beryllium, rare earths, etc., using conventional techniques, to replace a substantial amount of the sodium cations. Thus, one polyvalent cation will be associated with more than one aluminum-centered $AlO_4$ tetrahedron in the structure of the aluminosilicate. If the $AlO_4$ tetrahedra are spread sufficiently apart in the zeolite structure, due to the presence of silicon-centered $SiO_4$ tetrahedra, areas of local electrical charge will be formed which aid in promoting catalytic reactions. Another treating technique to increase the catalytic activity of the alumino-silicates is to ion-exchange with ammonium ions followed by thermal treatment, preferably at about 575° F., or acid leaching, to convert the crystalline aluminosilicate to the hydrogen form. Among the crystalline aluminosilicates which are suitable for use in the preferred isomerization catalyst in the present invention are the hydrogen and/or polyvalent cation forms of faujasite and mordenite and especially preferable is the hydrogen form of mordenite. The concentration of the crystalline aluminosilicate employed may be as high as 100 percent, or the crystalline aluminosilicate may be utilized within an amorphous matrix which may be selected from the group consisting of silica, alumina, and silica-alumina mixtures. The preferred catalyst comprises a combination of the crystalline aluminosilicate with a boron halide. The boron halide may be combined directly with the crystalline aluminosilicate at a temperature of about 0° F. to about 600° F. and at a pressure of about 1 atmosphere to about 200 atmospheres. When the boron halide utilized is boron trifluoride, fluoride concentrations in the catalytic composite of about 0.01 wt. percent about 30 wt. percent are preferred. Boron trifluoride is particularly preferred as the boron halide for use in the present catalyst, although the catalyst is not restricted to its use. The catalyst may employ any of the known boron halides insofar as they are adaptable.

The preferred method by which the operation of the isomerization step of the present process may be effected is a continuous-type operation. One particular method is a fixed bed operation in which the feed stream comprising butene isomers is continuously charged to an isomerization reactor containing a fixed bed of catalyst, the reactor being maintained at olefin isomerization conditions including a temperature in the range from about 0° F. to about 800° F. or more, and a pressure of about 1 atmosphere to about 200 atmospheres or more. A preferred temperature is about 100° F. to about 300° F. and a preferred pressure is about 10 atmospheres to about 100 atmospheres. The preferred catalyst is suitable for either gas phase or liquid phase operations. The flow through the isomerization reactor in liquid phase operations, which are preferred, may be maintained at a liquid hourly space velocity of about 0.1 to about 20 or more, preferably in the range from about 0.1 to about 10. The isomerization zone may comprise an unpacked vessel or coil or may be lined with a packing material. The charge of butene isomers is passed over the catalyst bed in either an upward or downward flow and withdrawn continuously and recovered. It is contemplated within the scope of the present invention that gases such as boron halides, hydrogen, nitrogen, etc., may be continuously charged to the isomerization zone as desired.

Another continuous-type operation comprises a moving bed-type in which the butene isomers feed and the catalyst bed move co-currently or countercurrently to each other while passing through the isomerization zone. Still another type of operation which may be used is a batch-type operation in which a quantity of butene isomers feed and catalyst are placed in an appropriate reactor, the reactor is then heated to the desired temperature and maintained thereat for a predetermined residence time, and the hydrocarbons are then recovered and passed to the fractionation step.

Conventional sources of $C_4$ olefins, used as feeds to alkylation processes, contain a mixture of 1-butene, 2-butene and isobutylene. Although various attempts have been made in prior art to isomerize 1-butene by shifting the olefinic bond to provide 2-butene, it has been found, in general, that olefin isomerization conditions which favor economically desirable high conversion of 1-butene also tend to favor polymerization of isobutylene, a highly undesirable side reaction. Prior art has thus been limited to lower than optimum conversions of 1-butene to 2-butene when isobutylene is present in the feed stream to the isomerization operation. The process of the present invention at least partially overcomes the problems thereby created. In the present process, it is not necessary to maintain olefin isomerization conditions such that an extremely high conversion of 1-butene is achieved, so that polymerization of isobutylene is thereby avoided. At the same time, by fractionating the effluent from the isomerization reactor to separate 2-butene from 1-butene and isobutylene, and recycling a portion of the 1-butene-isobutylene mixture to the isomerization step, an almost complete conversion of 1-butene is obtained.

Methods for processing the effluent from the isomerization operation to separate 2-butene from 1-butene and isobutylene are well known in the art. Fractionation is the preferred method, although other methods may be employed if they can be adapted. Preferably, the isomerization reactor effluent is charged to a conventional fractionation vessel having suitable conventional ancillary equipment such as reboiling means, refluxing means, trays, etc. The 2-butene component of the isomerization reactor effluent, including both cis- and trans-2-butene, has a sufficiently higher boiling point than 1-butene and isobutylene to make separation by fractionation feasible. The 2-butene stream thereby provided is passed to the alkylation step of the present process more fully described below.

When the 2-butene component has been separated, it is employed to alkylate an isoparaffin to provide an alkylation reaction product superior to that produced in conventional alkylation processes. The isobutane utilized as a feed stock for a conventional isobutane-olefin alkylation process is preferred for use in the present process. It is preferred that the isoparaffinic reactant which is contacted with the 2-butene stream is substantially free from 1-butene.

Various alkylation catalysts are known to be suitable for use in catalyzing the alkylation of an isoparaffin with an olefin. Examples of such catalysts which may be employed in the present process include hydrogen fluoride, sulfuric acid, aluminum chloride, phosphoric acid, and certain crystalline aluminosilicates such as faujasite, mordenite, etc., with or without solid supporting materials such as alumina, silica, etc. In the present process, hydrogen fluoride is a preferred alkylation catalyst. A hydrogen fluoride catalyst suitable for use in the alkylation step of the present process comprises at least about 70 wt. percent hydrogen fluoride and less than about 5 wt. percent water, preferably less than about 2 wt. percent water. Hydrogen fluoride alkylation catalysts containing organic diluents are preferred. Preferably, the hydrogen fluoride catalyst comprises about 80 to about 95 wt. percent hydrogen fluoride. A particularly preferred alkylation catalyst comprises about 90 wt. percent or more of hydrogen fluoride, less than about 10 wt. percent organic diluent and less than about 1 wt. percent water.

An alkylation zone employed in an embodiment of the present invention may suitably be any means which will contain the alkylation reaction mixture of isoparaffin olefin catalyst and reaction product at desired alkylation conditions. Numerous suitable alkylation vessels are known to prior art. The alkylation zone may comprise a continuous zone for contact and separation of catalyst and hydrocarbons or the contact zone may be separated from the separation zone with means for transferring the alkylation reaction mixture therebetween. Alkylation conditions in the alkylation zone include a temperature in a range from about 0° F. to about 200° F. and a pressure of about 1 atmosphere to about 50 atmospheres. Alkylation conditions preferably include a temperature of about 50° F. to about 100° F. and a pressure sufficient to maintain the reactants, catalyst and alkylation reaction product as liquids. Means for thoroughly admixing the catalyst with the reactants in the alkylation reactor should be included. Also necessary is a method for withdrawing heat from the alkylation zone. For example, the heat generated in the alkylation reaction may be withdrawn directly from the alkylation zone by indirect heat exchange between cooling water and the reaction mixture. Means for separating the hydrocarbon phase from the hydrogen fluoride catalyst phase by settling are well known in the alkylation art. Suitable separation means may be continuous with or distinct from the contact, or reaction, zone employed in a particular embodiment. Conditions maintained in such a settling operation in the alkylation step are substantially the same as those described under alkylation conditions above, with respect to temperature and pressure. The hydrocarbons and the catalyst are preferably maintained as liquids during the separation operation.

As described above, the 1-butene and isobutylene components of the effluent from the isomerization operation are separated from the 2-butene component, preferably by fractionation, and the 2-butene component is passed to the alkylation step. As stated, a major portion of the 1-butene and isobutylene components, in co-mixture, are recycled to the isomerization step in order to substantially completely convert the remaining 1-butene into the more desirable 2-butene. In order to obtain the advantage of the synergistic effect of alkylating 2-butene and isobutylene in co-mixture, it is also desirable to pass a portion of the commingled 1-butene and isobutylene to the alkylation step with the 2-butene stream. Although, obviously, some 1-butene is thereby included in the feed to the alkylation step, the minor amount of 1-butene so employed does not have a significant deleterious effect on the quality of the alkylation reaction product. Moreover, the amount of 1-butene relative to the amount of isobutylene which is charged to the alkylation step is very small, since in each pass through the isomerization step, a large preponderance of the 1-butene is converted into 2-butene. I have found that, when the fraction of 1-butene charged to the alkylation step is very small in comparison with the amount of 2-butene and isobutylene, e.g., less than about 10 wt. percent, the synergistic effects of alkylating commingled 2-butene and isobutylene more than compensate for the adverse effect caused by the presence of the minor amount of 1-butene. It is preferred that the portion of the 1-butene-isobutylene stream, recovered from the fractionation step, which is passed into the alkylation step be sufficient to provide the synergistic effects. Especially preferred is an amount which is about the same amount, by weight, as the amount of isobutylene passed into the isomerization step in the fresh $C_4$ olefin feed.

Examination of the data presented in Table I indicates that alkylation of isobutane with mixed 2-butene and isobutylene provides an alkylation reaction product having properties superior to that produced when isobutane is alkylated with the two olefins separately under the same process condition and the alkylation reaction products are combined. In Run 1, an olefinic feed composed of a mixture of 50 vol. percent 2-butene and 50 vol. percent isobutylene was alkylated with isobutane, producing an alkylation reaction product having a clear research octane number of 98.8 and a clear motor octane number of 96.6. In Run 2, 2-butene and isobutylene were reacted separately with isobutane under process conditions otherwise identical to those in Run 1, and subsequently the alkylation reaction products produced by alkylation of the olefins separately were combined to provide an alkylation reaction product containing 50 vol. percent of the 2-butene-derived alkylate and 50 vol. percent of the isobutylene-derived alkylate. Analysis of the combined product showed a clear research octane number of only 98.7 and a clear motor octane number of only 96.2. In Run 3, isobutane was alkylated with an olefin feed containing 75 vol. percent isobutylene and 25 vol. percent 2-butene. The alkylation reaction product was found to have a clear research octane number of 98.7 and a mol ratio of trimethylpentanes to dimethylhexanes of 15.0. In Run 4, isobutane was alkylated separately with 2-butene and with isobutylene under alkylation conditions otherwise identical to those in Run 3 and a composite alkylation product containing 75 vol. percent isobutylene-derived alkylate and 25 vol. percent 2-butene-derived alkylate was prepared. The composite product was found to possess a clear research octane number of only 98.4 and a trimethylpentanes to dimethylhexanes mol ratio of only 13.5. The data of Table I, thus, show that the product obtained from alkylation of a mixture of 2-butene and isobutylene is superior to that produced by separate alkylation of these isomers. In Run 5, isobutane was alkylated with 1-butene, and, separately, with isobutylene. A composite alkylate product composed of 50 vol. percent of the 1-butene-derived alkylate and 50 vol. percent of the isobutylene-derived alkylate was prepared. When this composite alkylate was analyzed, it was found to have a clear research octane number of 96.1 and a clear motor octane number of 94.1. In Run 6, an olefinic reactant composed of 50 vol. percent 1-butene and 50 vol. percent isobutylene was reacted with isobutane at alkylation conditions otherwise identical to those employed to produce the separate alkylate in Run 5. When the alkylate produced from the 1-butene-isobutylene mixture was analyzed, it was found to have a clear research octane number of only 94.8 and a clear motor octane number of only 93.1. The composite alkylate of Run 5 in the mixed butenes alkylate of Run 6 were further compared, and the mol ratio of trimethylpentanes to dimethylhexanes in the alkylate from Run 5 was found to be 5.4, while the mol ratio in the alkylate produced from the 1-butene-isobutylene mixture was found to be only 3.5. Thus, the beneficial effect of substantially excluding 1-butene from the olefins to be employed in an alkylation reaction is demonstrated.

TABLE I

| Description | Run 1 mixed olefins feed | 2 separate olefin feeds | 3 mixed olefins feed | 4 separate olefin feed | 5 separate olefin feeds | 6 mixed olefins feed |
|---|---|---|---|---|---|---|
| Process Conditions | | | | | | |
| Reactor Temp., °F. | 68 | 68 | 68 | 68 | 68 | 68 |
| Isobutane/Olefin mole ratio | 12 | 12 | 12 | 12 | 12 | 12 |
| Acid/hydrocarbons vol. ratio | 1.5 | 1.5 | 1.5 | 1.5 | 1.5 | 1.5 |
| Catalyst Analysis, wt.% | | | | | | |
| water | 1.0 | 1.0 | 1.0 | 1.0 | 1.0 | 1.0 |
| soluble hydrocarbons | 10 | 10 | 10 | 10 | 10 | 10 |
| acidity | 89 | 89 | 89 | 89 | 89 | 89 |
| 1-butene in olefin feed, wt.% | — | — | — | — | 50 | 50 |
| 2-butene in olefin feed, wt.% | 50 | 50 | 25 | 25 | — | — |
| Isobutylene in olefin feed, wt.% | 50 | 50 | 75 | 75 | 50 | 50 |
| Residence time, sec. | 600 | 600 | 600 | 600 | 600 | 600 |
| Alkylate Properties | | | | | | |
| Research octane number (clear) | 98.8 | 98.7 | 98.7 | 98.4 | 96.1 | 94.8 |
| Motor octane number (clear) | 96.6 | 96.2 | — | — | 94.1 | 93.1 |
| TMP/DMH mole ratio | — | — | 15.0 | 13.5 | 5.4 | 3.5 |

I claim as my invention:

1. A process for producing hydrocarbon alkylate which comprises subjecting a mixture of 1-butene, 2-butene and isobutylene to isomerization to convert a substantial portion of the 1-butene to 2-butene, fractionating the resultant isomerization mixture to separate an essentially 2-butene stream from a predominantly isobutylene stream containing a small amount of unconverted 1-butene, recycling a major portion of said predominantly isobutylene stream to the isomerization step, commingling the remaining minor portion of said predominantly isobutylene stream with said essentially 2-butene stream and with an isoparaffinic hydrocarbon in an amount such that the resultant mixture contains less than about 10 percent by weight of 1-butene based on the amount of 2-butene and isobutylene in said mixture, subjecting said resultant mixture to hydrogen fluoride alkylation to react the 2-butene and isobutylene with said isoparaffinic hydrocarbon, and recovering the resultant alkylate product.

2. The process of claim 1 further characterized in that said isomerization is catalyzed by a refractory inorganic oxide selected from alumina, silica, zirconia, chromium oxide and magnesia.

3. The process of claim 1 further characterized in that said isomerization is catalyzed by a crystalline aluminosilicate combined with a substantially anhydrous boron halide.

4. The process of claim 1 further characterized in that said isoparaffinic hydrocarbon is isobutane.

* * * * *